United States Patent
Saito et al.

(10) Patent No.: US 6,780,530 B2
(45) Date of Patent: Aug. 24, 2004

(54) MAGNETIC MATERIAL HAVING A HIGH SATURATION MAGNETIC FLUX DENSITY AND A LOW COERCIVE FORCE

(75) Inventors: Mikiko Saito, Tokyo (JP); Nobuyuki Ishiwata, Tokyo (JP); Tsutomu Ishi, Tokyo (JP); Hiroaki Honjo, Tokyo (JP); Tamaki Toba, Tokyo (JP); Shinsaku Saito, Tokyo (JP); Yoshihiro Nonaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/428,836

(22) Filed: May 5, 2003

(65) Prior Publication Data

US 2003/0194581 A1 Oct. 16, 2003

Related U.S. Application Data

(62) Division of application No. 09/680,256, filed on Oct. 5, 2000, now Pat. No. 6,592,811.

(30) Foreign Application Priority Data

Oct. 6, 1999 (JP) .......................................... 11-285122

(51) Int. Cl.⁷ ........................... B32B 9/00; G11B 5/127; G11B 5/147
(52) U.S. Cl. ........................ 428/692; 428/693; 428/900; 360/125; 360/313; 360/319
(58) Field of Search ................................. 428/692, 693, 428/900; 360/313, 319, 125

(56) References Cited

U.S. PATENT DOCUMENTS 6,275,360 B1 * 8/2001 Nakamoto et al. .......... 360/319

FOREIGN PATENT DOCUMENTS

| JP | 2-68906 A | 3/1990 |
|---|---|---|
| JP | H5-263170 | 10/1993 |
| JP | H5-290329 | 11/1993 |
| JP | H6-195637 | 7/1994 |
| JP | H6-318516 | 11/1994 |
| JP | H9-138909 | 5/1997 |
| JP | 63-065052 A | 3/1998 |
| JP | H10-188220 | 7/1998 |
| JP | H10-199726 | 7/1998 |
| JP | 11-74122 A | 3/1999 |

* cited by examiner

*Primary Examiner*—Holly Rickman
(74) *Attorney, Agent, or Firm*—Sughrue Mion, PLLC

(57) ABSTRACT

A magnetic material includes a main component expressed by a general formula CoNiFeX, wherein X is at least one element selected from the group consisting of Cr, Ti, V, Ru, Rh, Pd, Os, Ir and Pt, and wherein weight percentages a, b, c and d of Co, Ni, Fe and X contents, respectively, in the main component are such that $40\% \leq a \leq 10\%$, $5\% \leq b \leq 20\%$, $10\% \leq c \leq 30\%$, and $0\% < d \leq 10\%$.

6 Claims, 5 Drawing Sheets

MAGNETIC MATERIAL HAVING A HIGH SATURATION MAGNETIC FLUX DENSITY AND A LOW COERCIVE FORCE

This is a divisional of application Ser. No. 09/680,256 filed Oct. 5, 2000, now U.S. Pat. No. 6,592,811; the disclosure of which is incorporated herein by reference.

BACKGROUND OF THE INVENTION (a) Field of the Invention

The present invention relates to a magnetic material having a high saturation magnetic flux density and a low coercive force and suited for use in a recording magnetic core, and a magnetic head having a magnetic core including the magnetic material.

(b) Description of a Related Art

A magnetic recording head for use in a magnetic data recording/reproducing device, such as a magnetic disk drive, is requested to generate a strong and steep writing magnetic field in order for high-density magnetic recording. For achieving a strong writing magnetic field, the magnetic materials for use in the recording magnetic core should have a higher saturation magnetic flux density. In addition, since the magnetic material should be excited by as low an exciting current flowing through a writing coil as possible, the magnetic material should have excellent soft magnetic properties such as a lower coercive force and a higher permeability.

The conventional magnetic materials used in the recording magnetic core include a nickel-iron alloy selected from the nickel-iron alloys called Permalloys, that includes nickel at about 82% and has a substantially zero magnetic distortion constant. This type of permalloys, which is called hereinafter "82 permalloy", has a saturation magnetic flux density of about one tesla [T]. If it is possible to use a magnetic material having a saturation magnetic flux density higher than that of the 82 permalloy in a magnetic head, the resultant magnetic head generates a higher and steeper writing magnetic field.

Patent Publication JP-A-2-68906 describes a three-component plating magnetic film, or CoNiFe film. In the three-component plating CoNiFe film, the Ni content should be as low as possible in order to achieve a higher saturation magnetic flux density. To the contrary, however, the Ni content should be as high as possible in order to obtain a fcc structure which affords excellent soft magnetic properties, such as a low magnetic distortion. That is, the high saturation magnetic flux density and the excellent soft magnetic properties are trade-off in the three-component plating CoNiFe film.

On the other hand, Patent Publication JP-A-11-74122 describes another three-component plating CoNiFe film wherein the high saturation magnetic flux density and the excellent soft magnetic properties are compatible. In the plating CoNiFe film described in the latter publication, by conducting the filming without adding additives such as saccharin, a saturation magnetic flux density as high as 2.0 tesla or above is achieved even in the case of Ni content being around 10 weight percents (wt %).

FIGS. 1 and 2 show the boundary lines between the compositions for obtaining fcc structure and the bcc structure in the three-component plating CoNiFe film in the cases of no saccharin addition and saccharin addition, respectively. As understood from these drawings, the boundary line between the fcc structure and the bcc structure in the case of no saccharin addition is significantly shifted toward the lower side of the Ni content compared to the case of saccharin addition. This teaches that the crystal structure of the three-component plating CoNiFe film can be controlled based on the content of each component as well as the process conditions.

In short, the latter publication describes a magnetic material which achieves excellent soft magnetic properties as well as a high saturation magnetic flux density around 1.8 to 2.0 tesla by priorly orienting the magnetic material toward the fcc plane. The terms "fcc" and "bcc" as used herein mean the "face-centered cubic lattice" and the "body-centered cubic lattice", respectively.

In order to achieve a magnetic recording operation for a magnetic disk having a recording capacity as high as 10 giga-bit or more, it is considered that the magnetic head should be able to write data to or read data from the magnetic disk having a coercive force of 4000 oersted or more. In this case, the recording magnetic head is also requested to achieve a steeper magnetic field gradient and a higher saturation magnetic flux density.

The magnetic head having the three-component plating CoNiFe film described in the latter publication does not have a sufficient recording ability on the recording medium having a coercive force of 4000 oersteds or more, so long as a NiFe film having a saturation magnetic flux density around 1 Tesla is used as an underlying layer for the CoNiFe film. In addition, a CoNiFe film, if used as an underlying layer for the three-component plating CoNiFe film, has problems in that a lower coercive force sufficient as a soft magnetic property is not obtained, and that the CoNiFe film is dissolved during the fabrication process due to a poor corrosion resistance.

SUMMARY OF THE INVENTION

It is therefore an object of the present invention to provide a magnetic material having a higher corrosion resistance, a higher saturation magnetic flux density and excellent soft magnetic properties.

The present invention also provides a magnetic head having such a magnetic material.

The present invention provides a magnetic material including a main component expressed by a general formula CoNiFeX, wherein X is at least one element selected from the group consisting of Cr, Ti, V, Ru, Rh, Pd, Os, Ir and Pt, and wherein weight percentages a, b, c and d of Co, Ni, Fe and X contents, respectively, in said main component are such that $40\% \leq a \leq 10\%$, $5\% \leq b \leq 20\%$, $10\% \leq c \leq 30\% 0\% < d \leq 10\%$, and $a+b+c+d=100\%$.

In accordance with the magnetic material of the present invention, a higher saturation magnetic flux density, excellent soft magnetic properties and a high corrosion resistance can be achieved due to the specified composition thereof.

It is preferable that the magnetic material of the present invention has a peak intensity of the bcc (110) measured by X-ray diffraction which is 0.1 to 1.0 times the peak intensity of the fcc (111) measured by X-ray diffraction. In addition, a film made of the magnetic material may be formed on an orientation control film. The orientation control film may preferably include at least one substance selected from the group consisting of Ta, Zr, Ti, Mo, Cr, V and NiFe. The orientation control film may have a preferable thickness of 10 nm to 100 nm for further improving the characteristics of the magnetic material.

The present invention also provides a magnetic head including a recording head including first and second magnetic cores sandwiching therebetween a recording gap, and a writing coil for generating a magnetic flux in the first and second magnetic cores and a writing magnetic field in the recording gap, the second magnetic core including a first magnetic layer made of a first magnetic material and a second magnetic layer formed on the first magnetic layer, the first magnetic material including a main component thereof expressed by a general formula CoNiFeX, wherein X is at least one element selected from the group consisting of Cr, Ti, V, Ru, Rh, Pd, Os, Ir and Pt, and wherein weight percentages a, b, c and d of Co, Ni, Fe and X contents, respectively, in the main component are such that $40\% \leq a \leq 10\%$, $5\% \leq b \leq 20\%$, $10\% \leq c \leq 30\%$, and $0\% < d \leq 10\%$.

In a preferred embodiment of the present invention, the second magnetic recording layer can be formed as a plating layer for the underlying first magnetic recording layer. This structure affords a strong and steep magnetic field for the magnetic head.

The second magnetic recording layer may include a first film including CoNiFe as a main component thereof and a second film including NiFe as a main component thereof, the first film being disposed adjacent to the first magnetic recording layer. In this structure, a magneto-resistance effect element may be provided between a pair of magnetic shield films, with an intervention of a magnetic isolation layer between the magneto-resistance effect element and each of the magnetic shield films, whereby one of the magnetic shield films can be used as a magnetic recording core of a recording head.

The above and other objects, features and advantages of the present invention will be more apparent from the following description, referring to the accompanying drawings.

PREFERRED EMBODIMENTS OF THE INVENTION

Figure 1:
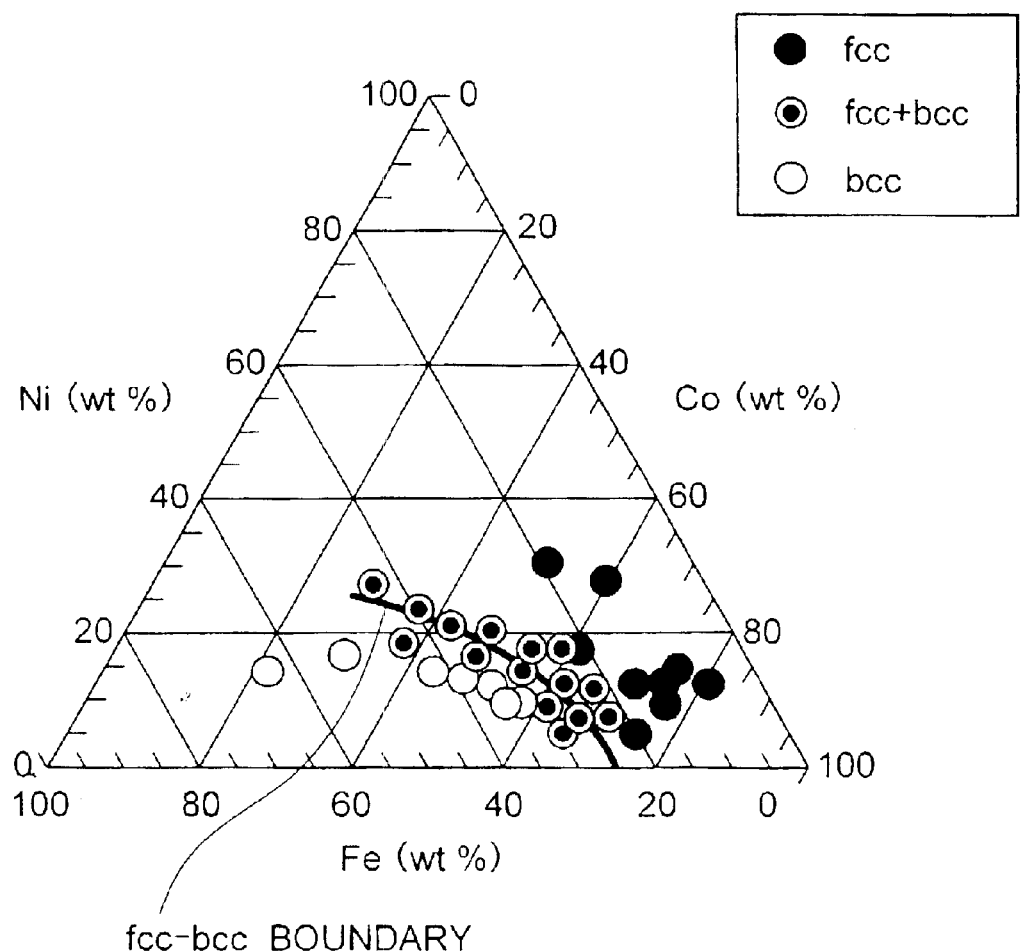
FIG. 1 is a graph showing the crystal structure of the three-component plating CoNiFe film without addition of saccharin.
Figure 2:
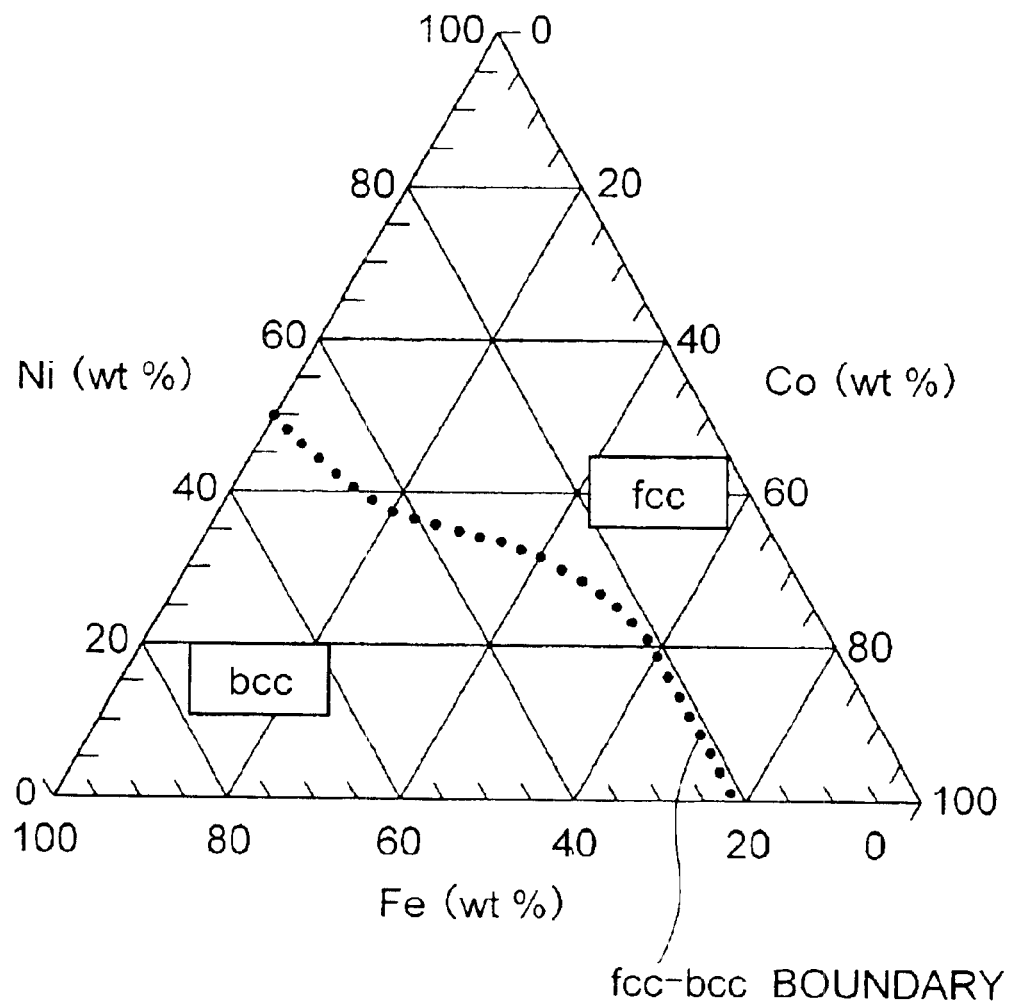
FIG. 2 is a graph showing the crystal structure of the three-component plating CoNiFe film with saccharin addition.

Now, the present invention is more specifically described with reference to preferred embodiments thereof.

A magnetic material according to a first embodiment of the present invention includes CoNiFeX as a main component thereof wherein X is at least one substance selected from the group consisting of Cr, Ti, V, Ru, Rh, Pd, Os, Ir and Pt, and wherein the weight percentages a, b, c and d of Co, Ni, Fe and X contents, respectively, are such that $40\% \leq a \leq 75\%$, $5\% \leq b \leq 20\%$, $10\% \leq c \leq 30\%$, and $0\% < d \leq 10\%$.

In a sample of the magnetic material of the present embodiment, the crystal structure of CoNiFe was controlled by using an additive such as Cr added in a small-grain-size area, which resided in the mixed crystal area or in a fcc area in the vicinity of the mixed crystal area. The resultant crystal of CoNiFe exhibited a peak intensity ratio of fcc(200)/fcc (111) which is below 0.25 in an X-ray diffraction, and exhibited a low coercive force, a low magnetic distortion constant and a high saturation magnetic flux density of around 2 tesla in the area wherein the peak intensity of the bcc(110) is 0.1 to 1.0 times the peak intensity of the fcc(111).

More specifically, the magnetic material had excellent soft magnetic properties such as a coercive force below 2 Oe and a magnetic distortion constant below $5 \times 10^{-6}$, and a saturation magnetic flux density as high as 1.8 to 2.0 tesla.

By providing the magnetic material on an orientation control layer made of Ti, NiFe etc. and having an orientation priority for orienting toward the fcc plane, the resultant CoNiFe layer had a further orientation priority for the fcc plane and thus exhibited excellent soft magnetic properties. A preferable lower limit of the thickness of the orientation control layer is 10 nm in consideration that the orientation control layer should function as a fcc orientation layer and that a thinner layer affords a steeper magnetic field gradient. A preferable upper limit of the orientation control layer is 100 nm in consideration that it should not affect the controllability of the gap length by the other constituent elements that control the gap length.

Table 1 shows the dependency of the peak intensity ratio between and fcc(111) and coercive force on the additive amount of Cr.

TABLE 1

| Cr content % | bcc(110)/fcc(111) | Coercive force | Remarks |
| --- | --- | --- | --- |
| 0 | 1.5 | above 10.0 | |
| 0 | 1.0 | below 10.0 | Ti orientation film |
| 2 | 1.0 | below 10.0 | |
| 2 | 0.5 | below 2.0 | |
| 4 | 0.56 | below 2.0 | Ti orientation film |
| 8 | 0.12 | below 1.0 | |

From the above table, it is understood that: (1) the peak intensity of bcc (110) reduces and the peak intensity of fcc (111) increases with the increase of Cr content; (2) the coercive force reduces with the increase of Cr content; and (3) the peak intensity ratio bcc(110)/fcc(111) increases and the coercive force reduces with the increase of Cr content even with the fcc orientation control film such as Ti film.

Table 2 shows the dependency of the pitting potential of the material in a sodium chloride solution on the Cr content.

TABLE 2

| Cr content | Pitting Potential (mV) |
| --- | --- |
| 0 | +50 |
| 2 | +200 |
| 4 | +250 |
| 8 | +350 |

It is understood from Table 2 that a higher Cr content shifts the pitting potential to a higher potential to thereby increase the anti-corrosion property of the magnetic material. It is to be noted that the increase of the Cr content reduces the saturation magnetic flux density, as described before. For example, a 10 wt % Cr content reduces the saturation magnetic flux density down to 1.4 tesla. From these results, it was confirmed that the magnetic material expressed by the general formula CoNiFeCr improves the magnetic characteristics thereof over the conventional magnetic material so long as the percentages a, b, c and d of the Co, Ni, Fe and Cr contents, respectively, reside in the ranges $40\% \leq a \leq 75\%$, $5\% \leq b \leq 20\%$, $10\% \leq c \leq 30\%$ and $0\% < d \leq 10\%$.

Besides Cr, it was confirmed that other additive elements including Ti, V, Ru, Rh, Pd, Os, Ir and Pt also had a similar function.

Figure 3:
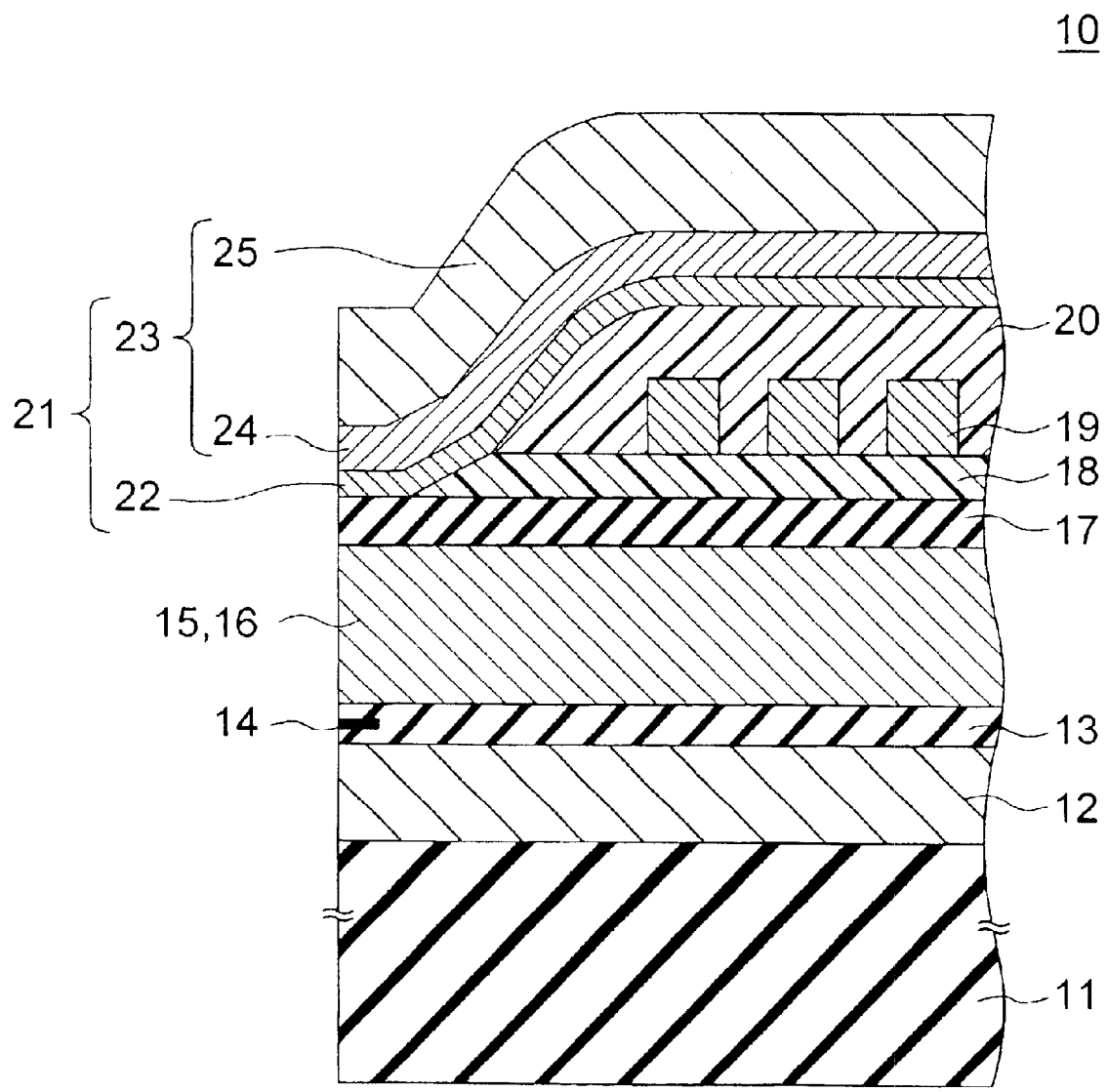
FIG. 3 is a sectional view of a magnetic head according to an embodiment of the present invention.

Referring to FIG. 3 showing a magnetic head, generally designated by numeral 10, according to a first embodiment of the present invention in a sectional view taken along a plane normal to an air baring surface, the magnetic head includes a substrate 11 acting as a slider, on which a giant magneto-resistivity (GMR) head having a read function for reading data on a magnetic disk is mounted. The substrate 11 is made of compound ceramics including alumina and titan carbide.

The GMR head includes a bottom shield layer 12 made of CoZrTa patterned on the substrate 11 and a top shield layer 15 made of plating NiFe including about 80 wt % Ni, the bottom shield layer 12 and the top shield layer 15 sandwiching therebetween a GMR element 14 which is separated from both the shield layers 12 and 15 by a magnetic isolation layer 13 made of alumina. The bottom shield layer 12 is 1 μm thick, whereas the top shield layer 15 is 3 μm thick. The distance between the bottom shield layer 12 and the top shield layer 15 is 0.13 μm. The top shield layer 15 is made of plating NiFe film, and also functions as a recording magnetic core 16 of an inductive magnetic head.

A recording gap layer 17 made of alumina having a thickness of 0.18 μm is formed on the recording magnetic core 16. An insulating film 18 made of non-magnetic insulator formed on the recording gap layer 17 provides a zero-throat-height recording operation. An exciting coil 19 implemented by a Cu pattern is formed on the insulating film 18 by a plating technique, and an insulating film 20 made of non-magnetic insulator such as photoresist functions for insulating the Cu coil 19. The current flowing through the exciting coil 19 generates a magnetic flux in the recording magnetic cores 16 and 21 and thereby generates a writing magnetic field in the gap layer 17 between the magnetic cores.

The recording magnetic core 21 includes a first magnetic layer 22 and a second magnetic layer 23 formed thereon and including a lower magnetic film 24 and an upper magnetic film 25. The first magnetic layer 22 is made of the magnetic material according to the present invention, and functions as an underlying layer for the lower magnetic film 24 which is formed by an electrolytic plating technique. The first magnetic layer 22 is formed by a RF-magnetron sputtering technique, and includes a 10-nm-thick Ti film acting as an orientation control layer and a 100-nm-thick magnetic film formed thereon and including CoNiFe added with Cr. This magnetic film has a composition of 65Co-10Ni-21Fe-4Cr (in wt %).

The lower magnetic film 24 is made of CoNiFe having a saturation magnetic flux density of 2 tesla, and formed on the first magnetic layer 22 by using a plating liquid including no saccharine. Exemplified conditions of the plating liquid are shown in Table 3.

TABLE 3

| Component | Content (mol./litter) |
|---|---|
| Co sulfate | 0.092 |
| Cr sulfate | 0.01 to 0.1 |
| Ni sulfate | 0.2 |
| ammonium chloride | 0.28 |
| boric acid | 0.4 |
| ferrous sulfate | 0.0016 |
| current density | 15.0 mA/cm$^2$ |
| pH | 2.8 |

The upper magnetic film 25 is made of NiFe having a saturation magnetic flux density of 1.6 tesla, and formed on the lower magnetic film 24 by a similar plating technique. The lower magnetic film 24 is 0.55 μm thick, and includes 65 wt % Co, 12 wt % Ni and 23 wt % Fe. The upper magnetic film 25 is 3.0 μm thick, and includes 45 wt % Ni and 55 wt % Fe.

The sample of the magnetic head of the present embodiment as described above was experimentally fabricated, and another magnetic head was also formed as a comparative example wherein the first magnetic layer 22 was replaced by a 82 permalloy film and the second magnetic layer 23 was replaced by a single CoNiFe film.

The magnetic head of the embodiment, by using therein the magnetic material having a high saturation magnetic flux density as an underlying layer for the electrolytic plating, achieved a 10% increase in the saturation magnetic flux density over the comparative example, wherein the 82 Permalloy film generally used as the underlying layer for sputtering is used. In addition, by using additives, such as Cr, to decrease the coercive force of the underlying layer, the magnetic head of the embodiment had excellent read/write characteristics such as a noise characteristic. In the case of using Ti, V, Ru, Rh, Pd, Os, Ir and Pt as an additive, the magnetic head had an excellent soft magnetic film similarly to the case of using Cr as an additive. Further, since these additives provide a feasibility of formation of an excellent passive state film, the resultant film had an excellent anti-corrosion property and thus provided favorable effects for the subsequent process for the fabrication of the magnetic head, such as a removal process for the underlying layer.

A magnetic head according to a second embodiment is similar to the first embodiment except that the orientation control Ti film in the first embodiment is replaced by a Ta, Zr, Ti, Mo, Cr, V or NiFe film. Each of the samples fabricated according to the second embodiment had an excellent soft magnetic film and exhibited excellent read/write characteristics, similarly to the first embodiment.

A magnetic head according to a third embodiment of the present invention is similar to the first embodiment except that the lower magnetic film 24 in the first embodiment is replaced by a CoNiFeCr film formed by a plating process using the plating liquid and conditions shown in Table 4.

TABLE 4

| Components | Content (mol./litter) |
|---|---|
| Co sulfate | 0.092 |
| Ni sulfate | 0.2 |
| ammonium chloride | 0.28 |
| boric acid | 0.4 |
| ferrous sulfate | 0.0016 |
| current density | 15.0 mA/cm$^2$ |
| pH | 2.8 |

The resultant lower magnetic film 24 had a saturation magnetic flux density of 1.8 to 2.0 tesla, and a composition of 65 wt % Co, 10 wt % Ni, 21 wt % Fe and 4 wt % Cr. The magnetic head had an excellent soft magnetic layer and exhibited excellent read/write characteristics, similarly to the first embodiment.

Figure 4:
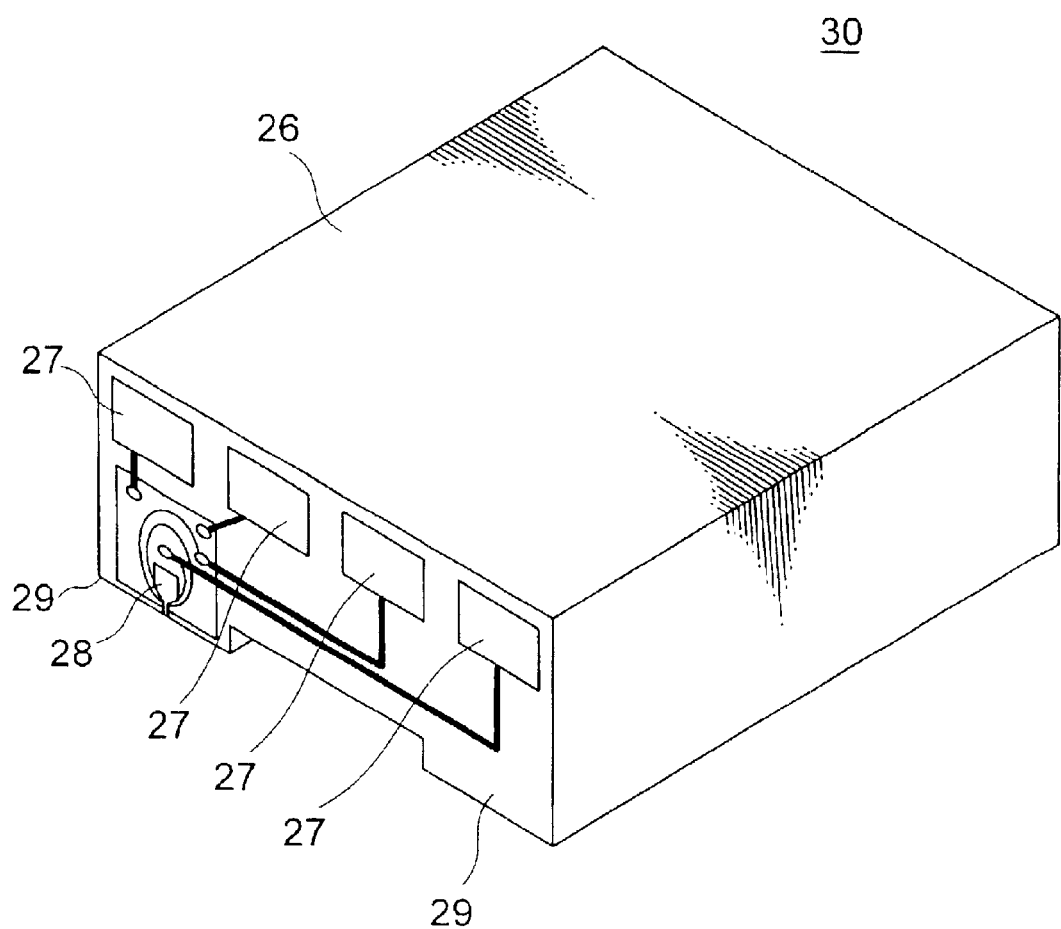
FIG. 4 is a perspective view of the magnetic head of FIG. 2.

Referring to FIG. 4, a magnetic head, generally designated by numeral 30, according to an embodiment of the present invention includes a head slider 26, and a plurality of electrodes 27 and a recording/reproducing magnetic transducer 28 which are formed on a front end surface of the head slider 26. The head slider 26 has a pair of bottom legs 29 each having an air baring surface opposing a recording surface of a magnetic disk. The magnetic transducer 28 has a writing head and a reading head (such as shown in FIG. 3) which operates at the bottom of the front end surface of the bottom legs 29.

Figure 5:
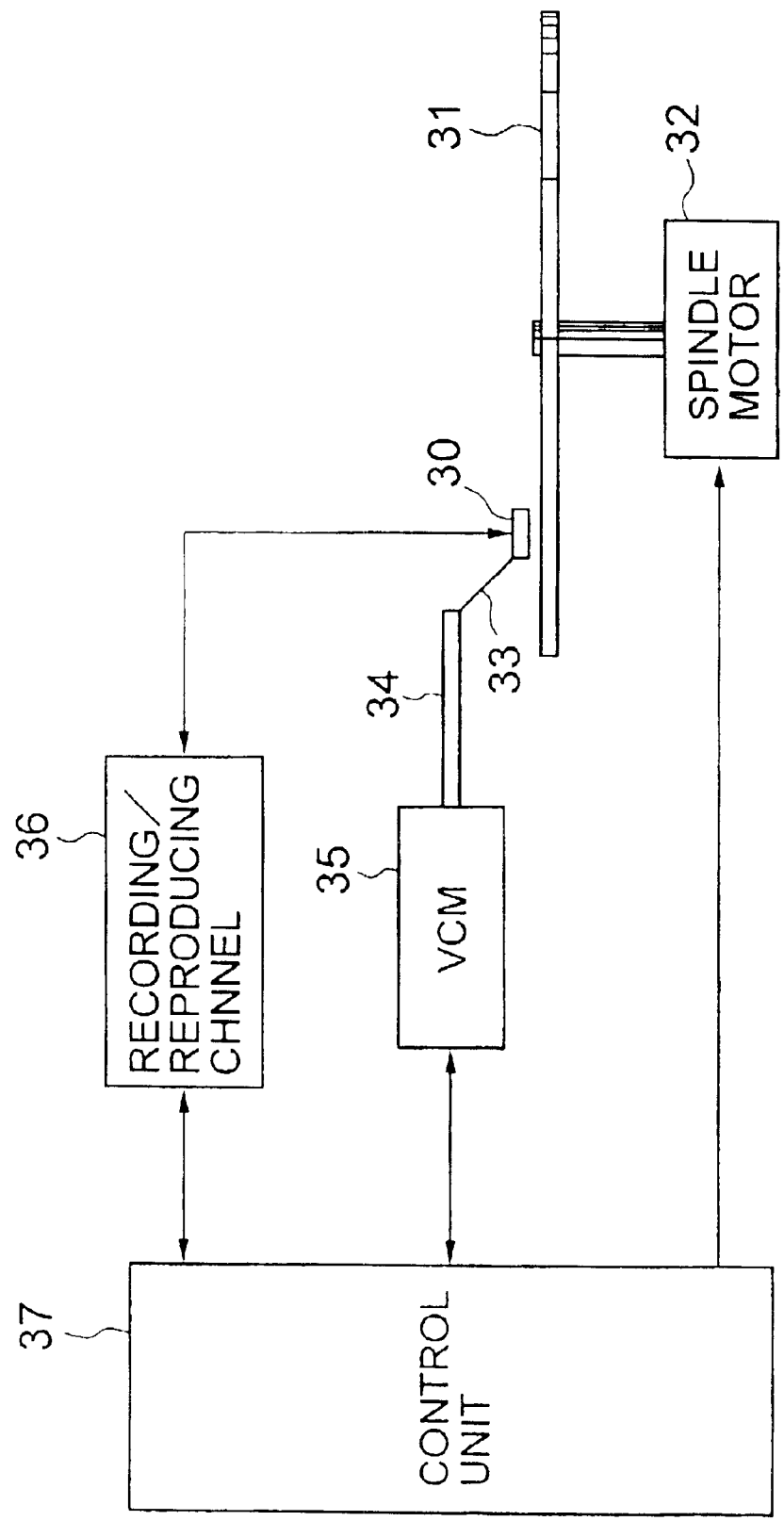
FIG. 5 is a block diagram of a magnetic recording/reproducing device including the magnetic head of FIG. 2.

Referring to FIG. 5, a disk drive according to an embodiment of the present invention includes the magnetic head 30 shown in FIG. 4, which is supported by an arm 33 and a suspension 34 to oppose the recording surface of a magnetic disk 31. The magnetic disk 31 is rotated by a spindle motor 32 controlled by a control unit 37, and moved in the radial direction of the magnetic disk 31 for a tracking control by using a voice coil motor 35. The control unit 37 supplies writing data and receives read data through a read/write channel 46 to and from the magnetic head 30. The control unit 37 also controls the voice coil motor 35 for the tracking control.

Since the above embodiments are described only for examples, the present invention is not limited to the above embodiments and various modifications or alterations can be easily made therefrom by those skilled in the art without departing from the scope of the present invention.

What is claimed is:

1. A magnetic head comprising a recording head including first and second magnetic cores sandwiching therebetween a recording gap, and a writing coil for generating a magnetic flux in said first and second magnetic cores and a writing magnetic field in said recording gap, said second magnetic core comprising a first magnetic layer made of a first magnetic material and a second magnetic layer formed on said first magnetic layer, said first magnetic material comprising a component thereof expressed by a formula CoNiFeX, wherein X is at least one element selected from the group consisting of Cr, Ti, V, Ru, Rh, Pd, Os, Ir and Pt, and wherein weight percentages a, b, c and d of Co, Ni, Fe and X contents, respectively, in said component are such that $40\% \leq a \leq 10\%$, $5\% \leq b \leq 20\%$, $10\% \leq c \leq 30\%$, and $0\% < d \leq 10\%$ wherein said first magnetic layer comprises an orientation control film underlying said first magnetic material and wherein said orientation control film comprises at least one substance selected from the group consisting of Ta, Zr, Ti, Mo, Cr, V and NiFe.

2. The magnetic head as defined in claim 1, wherein said orientation control film has a thickness between 10 nm and 100 nm.

3. The magnetic head as defined in claim 1, wherein said second magnetic layer comprises CoNiFe as a component thereof.

4. The magnetic head as defined in claim 1, wherein said second magnetic layer comprises a lower film comprising CoNiFe as a component thereof and an upper film comprising NiFe as a component thereof.

5. The magnetic head as defined in claim 1, further comprising a reading head comprising a magneto-resistance effect element, wherein said first magnetic core functions as a magnetic shield layer for said magneto-resistance effect element.

6. The magnetic head as defined in claim 1, wherein said second magnetic layer is formed by a plating technique using said first magnetic layer as an underlying layer.

* * * * *